United States Patent
Bender et al.

(10) Patent No.: US 6,962,622 B2
(45) Date of Patent: Nov. 8, 2005

(54) TITANIUM DIOXIDE PIGMENT COMPOSITION

(75) Inventors: Jürgen Bender, Monheim (DE); Siegfried Blümel, Ratigen (DE); Volker Schmitt, Leichlingen (DE); Brigitte Vielhaber-Kirsch, Overath (DE)

(73) Assignee: Kronos Titan GmbH (DE)

( * ) Notice: Subject to any disclaimer, the term of this patent is extended or adjusted under 35 U.S.C. 154(b) by 87 days.

(21) Appl. No.: 10/468,048

(22) PCT Filed: Mar. 12, 2002

(86) PCT No.: PCT/DE02/00863

§ 371 (c)(1),
(2), (4) Date: Aug. 13, 2003

(87) PCT Pub. No.: WO02/077107

PCT Pub. Date: Oct. 3, 2002

(65) Prior Publication Data

US 2004/0094068 A1 May 20, 2004

(30) Foreign Application Priority Data

Mar. 28, 2001 (DE) .......................................... 101 15 544

(51) Int. Cl.⁷ .................................................. C09C 1/36

(52) U.S. Cl. ......................... 106/442; 106/339; 106/443
(58) Field of Search ................................. 106/436, 339, 106/442, 443, 439; 423/610

(56) References Cited

U.S. PATENT DOCUMENTS

| 3,510,335 A | * | 5/1970 | McGinnis | 106/437 |
| 5,137,575 A | | 8/1992 | Yasuki et al. | |
| 5,753,025 A | | 5/1998 | Bettler et al. | |
| 6,200,375 B1 | | 3/2001 | Guez et al. | |

FOREIGN PATENT DOCUMENTS

EP 04 01 045 B1 12/1990

* cited by examiner

Primary Examiner—J. A. Lorengo
Assistant Examiner—S. S. Manlove
(74) Attorney, Agent, or Firm—Rodney T. Hodgson

(57) ABSTRACT

The invention relates to a titanium dioxide pigment mixture comprising a pigment having high greying stability (pigment type A) and a pigment having increased $SiO_2$ and $Al_2O_3$ content in flaky precipitation (pigment type B). Said mixture provides, for example in paper, a high level of opacity for sufficient greying stability. If necessary, the light-fastness of the paper can be further increased by means of known production-conditioned measures on pigment type B.

13 Claims, No Drawings

TITANIUM DIOXIDE PIGMENT COMPOSITION

The invention relates to a titanium dioxide pigment composition.

For certain applications, white papers are required to have high opacity (hiding power), high brightness with the most neutral possible tone, and good greying resistance (light-fastness). Titanium dioxide pigments (laminating paper pigments) with a low tendency to greying are known. However, the amount of these pigments that can be incorporated into papers is often limited because, in the event of an excessive pigment concentration, the physical properties of the paper no longer meet the requirements, e.g. for sufficient wet strength. Consequently, there are limits to the opacity that can be achieved with the customary pigments.

It is known (U.S. Pat. No. 3,510,335) that the hiding power of titanium dioxide pigments that are particularly suitable for the production of (matte) emulsion paints can be increased by means of a special type of post-treatment. They are coated to a relatively high level (at least 5% by weight) with silicon oxide and aluminium oxide, the coating being applied by a precipitation method aimed at achieving the most voluminous, porous, flocculent, loose, "fluffy" coating possible. Their greying resistance is, however, inadequate.

It has also been found that neither a "classical laminating paper pigment" with additional "emulsion paint pigment" post-treatment, nor an "emulsion paint pigment" with additional "laminating paper pigment" post-treatment is suitable for certain applications.

Consequently, it is expected of an improved laminating paper pigment that it be capable of achieving higher opacity, while retaining the same level of pigmentation and unchanged physical properties, especially wet strength. It is, of course, also a desirable goal to be able to reduce the amount of pigment used to achieve a required degree of opacity when using an improved pigment.

Surprisingly, the above-mentioned object is solved not by a single pigment, but by a titanium dioxide pigment blend consisting of the two pigment types, laminating paper pigment and emulsion paint pigment. It has been found that the addition of a pigment with a high level of special post-treatment, a kind of "booster pigment", to a classical laminating paper pigment results in a pigment blend that achieves the desired improvement in opacity described above, while also offering sufficient greying resistance, brightness and wet strength.

The invention relates to a blend of a pigment with high greying resistance, a typical laminating paper pigment (Pigment Type A), and a special emulsion paint pigment (Pigment Type B) characterised by an elevated $SiO_2$ and $Al_2O_3$ content applied by precipitation in flocculent form.

It achieves improved values as regards opacity, together with sufficient greying resistance, brightness and wet strength. The increase in opacity when using an unchanged quantity of $TiO_2$, or the possibility of achieving unchanged opacity with a lower level of $TiO_2$ input, gives rise to both technical and economic advantages.

Further advantageous embodiments are described in the sub-claims. An example of the invention is described in further detail below.

The pigments open to consideration as Pigment Type A include post-treated titanium dioxide pigments, whose base material can be manufactured by the sulphate process (SP) or the chloride process (CP), and which preferably have a rutile structure. The base material need not be stabilised, although special stabilisation is preferred: for CP base material, by Al doping of 0.3 to 3.0% by weight (calculated as $Al_2O_3$) and an oxygen surplus of at least 2% in the gas phase during oxidation of the titanium tetrachloride into titanium dioxide; for SP base material, by doping with, for example, Al, Sb, Nb or Zn ("light" stabilisation with Al is preferred for achieving sufficiently high brightness, or compensation with antimony in the case of larger quantities of Al dopant).

The pigments are typically given inorganic post-treatment with Al, P and/or Si compounds. Additional post-treatment with cerium and/or nitrate and/or zinc compounds serves to improve the greying resistance of the laminates, as does tempering at temperatures between 200 and 700° C., preferably 400 to 600° C.

Pigment Type A can also be characterised by its light-fastness value, assessed in the laminate: the grade on the blue wool scale (ISO 4586-2) is greater than 6; the CIELAB $\Delta L^*$ greying value (DIN 6174) is less than 1.5 after 96 hours of exposure in the Xenotest.

Pigments with high greying resistance (Pigment Type A) are, for example, commercially available under the designation KRONOS® 2080, 2081, 2084 and 2087.

The pigments open to consideration as Pigment Type B include post-treated titanium dioxide pigments, whose base material can be manufactured by the sulphate process or the chloride process, and which preferably have a rutile structure. The base material is preferably also stabilised: for CP base material, by Al doping of 0.3 to 3.0% by weight (calculated as $Al_2O_3$) and an oxygen surplus of 2 to 15% during gas phase oxidation of the $TiCl_4$ into $TiO_2$; for SP base material, by doping with, for example, Al, Sb, Nb or Zn ("light" stabilisation with Al is preferred for achieving sufficiently high brightness, or compensation with antimony in the case of larger quantities of Al dopant).

The pigments have a relatively high level of inorganic post-treatment with Al and Si compounds; the Al content (calculated as $Al_2O_3$) is at least 2% by weight and the Si content (calculated as $SiO_2$) at least 3% by weight, where the sum of the Si and Al components (calculated as oxide) totals at least 7% by weight.

According to the invention, one special characteristic of Pigment Type B is the flocculent, loose structure of the inorganic post-treatment skin on the base material. The aim is to achieve the most voluminous, porous, flocculent, loose, "fluffy" coating possible (described in U.S. Pat. No. 3,510,335, for example)—the opposite to "dense-skin treatment", as it were (described in U.S. Pat. No. 2,885,366). In dense-skin treatment, the post-treatment skin is supposed to enclose the $TiO_2$ particles as completely as possible, in order to reduce the undesirable photocatalytic effect of the $TiO_2$ pigment on the surrounding matrix. In contrast, the flocculent nature of the oxide or oxyhydrate layer of Pigment Type B results in improved dispersion of the pigment in a matrix and makes a decisive contribution to increasing the opacity. The loosely precipitated, inorganic oxide or oxyhydrate layer on the $TiO_2$ core acts as a spacer between the scattering particles.

Pigment Type B can also be characterised by property values. Parameters influenced by the "unevenness" or the compactness of the post-treatment skin are suitable for this purpose. A measure of the unevenness is, for example, the oil absorption or the specific surface area; a measure of incomplete coverage is, for example, the $H_2SO_4$ solubility of the pigment (the pigment is dispersed in concentrated sulphuric acid and the suspension kept at 175° C. for one hour; the soluble $TiO_2$ is determined in the filtrate after filtration): Pigment Type B according to the invention has elevated oil absorption (at least 25) or relatively high $H_2SO_4$ solubility (at least 15% $TiO_2$ dissolved).

The pigment blend according to the invention can also be characterised by property values assessed in the laminate. The following values refer to papers with an ash content of 40±1% and a grammage of 100±1 $g/m^2$.

a) Opacity
  i) CIELAB $L^*_{black} \geq 90.0$
  ii) Opacity value $L \geq 90.7$
b) Light-fastness
  i) Blue wool scale: Grade>6
  ii) CIELAB $\Delta L^* < 2.0$ Using a pigment blend according to the invention, the wet maximum load achieved for a paper (produced on the laboratory sheet former) is at least 3.7 N.

All the requirements imposed in the laminate sector are met by the pigment blend according to the invention.

The following measures, in particular, permit further advantageous improvements for Pigment Type B, especially in relation to the laminate greying resistance:

a) Supplementary additions of cerium, zinc or nitrate compounds during post-treatment or, in the case of nitrate, particularly preferably to the filter paste prior to drying. The addition of nitrate compounds during the final milling of the pigment is likewise possible.
b) Prior to the post-treatment that leads to the loose, "fluffy" post-treatment skin of $SiO_2$ and $Al_2O_3$ in the sense of this invention, an initial post-treatment step corresponding to that of Pigment Type A.

EXAMPLES OF PIGMENT TYPES A AND B (TABLE 1)

Pigment A1

Rutile pigment produced by the CP method and post-treated with 5.5 to 7.5% by weight* of an aluminium compound (calculated as $Al_2O_3$), 1.0 to 3.0% by weight of a phosphorus compound (calculated as $P_2O_5$) and additionally with 0.18 to 0.24% by weight of a nitrate; the property values are summarised in Table 1. A similar, typical "laminating paper pigment" is, for example, commercially available under the name KRONOS® 2080.

* All percent-by-weight data for post-treatment substances in the examples refer to the base material used.

Pigment B1

Pigment based on base material with a rutile structure, produced by the SP method without special stabilisation. The pigment has a relatively high level of inorganic post-treatment, where flocculent precipitation of the oxide layer is achieved by an appropriate process (production of a milled slurry at a pH value of 10.5; addition of 2.5% by weight $H_2SO_4$ and 5.1% by weight $SiO_2$ in the form of sodium silicate solution over 30 minutes; further pH reduction after a retention time of 30 minutes with 2.5% by weight $H_2SO_4$; addition of 5.1% by weight $SiO_2$ in the form of sodium silicate solution; after stirring for 30 minutes, addition of 2.3% by weight $Al_2O_3$ in the form of aluminium sulphate solution over 45 minutes, followed by stirring for 90 minutes; renewed addition of 2.9% by weight $Al_2O_3$ in the form of sodium aluminate solution, followed by washing and drying after a retention time of 60 minutes). The property values are given in Table 1.

Pigment B2

Pigment based on milled base material with a rutile structure without special stabilisation, as in Pigment B1. Flocculent precipitation by addition of 3.2% by weight $H_2SO_4$ over 30 minutes, followed by 3.2% by weight $SiO_2$ in the form of sodium silicate solution over 30 minutes; 3.5% by weight $Al_2O_3$ is subsequently added in the form of sodium aluminate solution, followed by stirring for 30 minutes; 2.0% by weight $Al_2O_3$ is then added in the form of aluminium sulphate solution and the suspension is filtered after a retention time of 60 minutes. Further treatment is carried out as for Pigment B1. In terms of "fluffiness", B2 is at the lower limit of Pigment Type B.

Pigment B3

Pigment based on SP base material stabilised with 0.01% by weight Al (calculated as $Al_2O_3$). Post-treatment over 15 minutes with 1.0% by weight $P_2O_5$ in the form of disodium hydrogenphosphate solution, over 10 minutes with 1.6% by weight $Al_2O_3$ in the form of aluminium sulphate solution and over 4 minutes with 1.4% by weight $Al_2O_3$ in the form of sodium aluminate solution. After adjusting the pH value to 4 with $H_2SO_4$ over 30 minutes, addition of 3.0% by weight $SiO_2$ in the form of sodium silicate solution together with aluminium sulphate solution (100 g $Al_2O_3$) in such a quantity that the pH value of 4 remains constant, followed by addition of 4.7% by weight $Al_2O_3$ in the form of sodium aluminate solution over 12 minutes and thereafter again of 2.2% by weight $Al_2O_3$ in the form of aluminium sulphate solution over 15 minutes. See Table 1 for the property values.

Pigment B4

Pigment based on SP base material stabilised with 0.6% by weight Al (calculated as $Al_2O_3$). It is milled and post-treated as described under B1 and, following the addition of 0.4% by weight nitrate to the filter paste in the form of sodium nitrate, dried and milled. See Table 1 for the property values.

Pigment B5

Pigment based on SP base material stabilised with 0.6% by weight Al (calculated as $Al_2O_3$). After milling, it is slurried and the pH value lowered with 1.9% by weight $H_2SO_4$; addition of 3.8% by weight $SiO_2$ in the form of sodium silicate solution over 20 minutes; after a retention time of 10 minutes, addition of 1.9% $H_2SO_4$ to lower the pH value; renewed addition of 3.8% by weight $SiO_2$ in the form of sodium silicate; after stirring for 10 minutes, addition of 2.0% by weight $Al_2O_3$ in the form of aluminium sulphate solution over 10 minutes, followed by addition of 3.2% by weight $Al_2O_3$ in the form of sodium aluminate; after a retention time of 60 minutes, filtration, washing, drying, milling.

Pigment B6

Pigment based on SP base material stabilised with 0.6% by weight Al (calculated as $Al_2O_3$). Following wet-milling, it is slurried and the pH value lowered with 2.9% by weight $H_2SO_4$; addition of 6.0% by weight $SiO_2$ in the form of sodium silicate solution over 30 minutes; 10 minutes' retention time; addition of 0.7% by weight $Al_2O_3$ in the form of aluminium sulphate solution over 5 minutes, followed by 3.7% by weight $Al_2O_3$ in the form of sodium aluminate solution and subsequently a further 1.1% by weight $Al_2O_3$ in the form of aluminium sulphate solution, stirring for 10 minutes between each addition. Further processing as for B5.

Pigment B7

This pigment differs from Pigment B6 only as regards the amount of the post-treatment substances. The quantities are as follows:

4.7% $H_2SO_4$
9.0% $SiO_2$ in the form of sodium silicate over 45 minutes
0.7% $Al_2O_3$ in the form of aluminium sulphate
3.8% $Al_2O_3$ in the form of sodium aluminate 0.9% $Al_2O_3$ in the form of aluminium sulphate All other process steps are comparable.

Typical values are compiled in Table 1. Compared to a standard laminating paper pigment (Pigment Type A), the oil absorption, $H_2SO_4$ solubility and BET surface are higher.

While Pigments B1 to B7 achieve the required values for opacity, expressed here by the values CIELAB $L^*_{black}$ and opacity value L, the greying resistance in the laminate and, in the case of Pigment B2, also the wet strength in the paper are inadequate.

Assessment of the Pigments and Pigment Blends in Laminates a) Laminate Production (Laboratory Scale)

A 36.5% aqueous pigment suspension made of 146 g titanium dioxide pigment (or pigment blend) and 254 g tap water is prepared. Testing is based on 30 g pulp (oven-dry). The corresponding quantity of pigment suspension is adapted to the retention and the required ash content, 40±1% in this case, or the grammage, 100±1 g/m² in this case. A person skilled in the art is familiar with the procedure and the auxiliaries used. The sheet to be impregnated with resin is immersed in a resin solution and pre-condensed for 25 seconds at 130° C. in a recirculating-air drying oven. Impregnation is performed a second time in similar manner. The resin solution amounts to 129 to 140% of the grammage. The sheet has a residual moisture content of 4 to 6% by weight. The condensed sheets are combined into stacks with phenolic resin-impregnated core papers, and white and black underlay paper. The laminate structure used for the test comprised 9 layers: paper, paper, core paper, core paper, underlay consisting of black underlay, core paper, core paper, black/white underlay, paper. The stacks are pressed for 300 seconds with the help of a Wickert® Type 2742 laminating press at a temperature of 140° C. and a pressure of 90 bar.

b) Opacity

The opacity is a measure of the light transmission of the paper. The following are selected as a measure of the opacity of the laminates:

i) CIELAB $L^*_{black}$, the brightness of the laminates measured over black underlay paper.

ii) Opacity value $L[\%]=Y_{black}/Y_{white} \times 100$, determined from the Y-value measured over black underlay paper ($Y_{black}$) and the Y-value measured over white underlay paper ($Y_{white}$).

The values are measured using a spectrophotometer (ELREPHO 3300).

c) Light-Fastness

To assess the greying resistance (light-fastness) of the titanium dioxide pigments or pigment blends, the corresponding laminate samples are exposed in a XENOTEST 150S. The side of the laminate on which two papers are laminated together is measured for the assessment.

i) Greying, CIELAB $\Delta L^*$

The CIELAB $L^*$ brightness to DIN 6174 is measured before and after 96 hours of exposure in the Xenotest. The light source is a xenon-arc lamp. The temperature inside the device is 23±3° C., the relative humidity being 65±5%. The samples are rotated during the exposure cycle.

ii) Blue wool scale

The light-fastness is assessed on the basis of ISO 4586-2 (1995) with the help of the "blue wool scale".

d) Wet Maximum Load

To assess the wet strength of the papers, they are initially stored ("matured") at 105° C. for 24 hours. Test strips of 15 mm width are soaked in distilled water for 5 minutes. The wet maximum load of the wet strips is subsequently tested with the help of tensile test apparatus. The wet strength is stated in Newton.

e) Determination of Optical Values

The optical values (CIELAB $L^*$, $a^*$, $b^*$) are determined to DIN 6174 with the help of the ELREPHO® 3300 spectrophotometer. The side of the laminate on which two papers were laminated together is measured for the assessment. Characteristic Performance Values for Individual Pigments and Pigment Blends (Table 2)

Test 1 (Standard Laminating Paper Pigment), Pigment A1 Only

Pigment A1, comparable to KRONOS® 2080, is used in pure form. The laminates are produced in accordance with the test method described above. Papers with an ash content of 40% and a grammage of 100 g/m² are produced in each case. To set the ash content, the necessary quantity of $TiO_2$ suspension is added to the pulp in each test. The targeted grammage of 100 g/m² is set via the quantity of pigment/pulp suspension. The quantities of $TiO_2$ suspension used in each case, and the quantity of pigment/pulp suspension, are listed in Table 2.

Test 2 (Standard Emulsion Paint Pigment), Pigment B1 Only

Test Pigment B1, which corresponds to a standard emulsion paint pigment, is used in pure form. The results of Test 2 are given in Table 2. Pigment B1 displays excellent opacity in comparison with A1. However, its greying resistance is low and unacceptable. Moreover, the sheets displayed very poor wet strength, i.e. they were very soft and tore easily during impregnation.

Test 3 (Standard Emulsion Paint Pigment), Pigment B2 Only

Pigment B2 is a standard emulsion paint pigment with a lower level of surface treatment compared to Pigment B1. The pigment is used in pure form. The results of Test 3 are listed in Table 2. Laminates containing Pigment B2 display significantly higher opacity compared to Pigment A1 as the reference standard, but are less good in comparison with Pigment B1. Pigment B2 likewise demonstrates inadequate greying resistance. There are no disadvantages in terms of wet strength.

Test 4 (A1/B2 Blend)

A pigment blend consisting of 70% by weight Pigment A1 and 30% by weight Pigment B2 is used in this test. The results of Test 4 are listed in Table 2. This laminate containing a 70:30 pigment blend displays improved opacity compared to Test 1. The greying resistance is still acceptable.

Test 5 (A1/B3 Blend)

A pigment blend consisting of 70% by weight A1 and 30% by weight B3 is used in this test. The latter is based on a bright, lightly stabilised base material with "classical laminating paper pigment post-treatment" and additional "emulsion paint pigment post-treatment". The results of Test 5 are listed in Table 2. The above pigment blend results in laminates with substantially better opacity compared to Test 1, the greying resistance being at an acceptable level.

Test 6 (A1/B4 Blend)

A pigment blend consisting of 70% by weight Pigment A1 and 30% by weight Pigment B4 is used in this test. Pigment B4 has similar surface treatment to Pigment B1, but is produced using highly stabilised base material. The results are listed in Table 2. It can be seen that the switch to highly stabilised base material greatly improves the greying resistance. The laminates display substantially improved opacity compared to Test 1. The wet strength of the papers is lower than with pure A1, but acceptable.

Test 7 (A1/B5 Blend)

A pigment blend consisting of 70% by weight Pigment A1 and 30% by weight Pigment B5 is used in this test. The latter is a pigment with surface treatment similar to that of Pigment B4, but produced with approx. 25% less $SiO_2$ Titanium dioxide pigment compositions are preferred in which the content of Pigment Type B is between 10 and 90% by weight, particularly preferably 30 to 50% by weight, of the pigment blend.

TABLE 1

|  | Pigment | | | | | | | |
| --- | --- | --- | --- | --- | --- | --- | --- | --- |
|  | A1 | B1 | B2 | B3 | B4 | B5 | B6 | B7 |
| $Al_2O_3$ post-treatment quantity (% referred to base material) | 6.5 | 5.2 | 5.5 | 10.2 | 5.2 | 5.2 | 5.5 | 5.4 |
| $SiO_2$ post-treatment quantity (% referred to base material) | <0.01 | 10.2 | 3.2 | 3.0 | 10.2 | 7.6 | 6.0 | 9.0 |
| Oil absorption (g/100 g) | 18 | 40 | 26 | 29 | 41 | 49 | 35 | 34 |
| $H_2SO_4$ solubility (% $TiO_2$ dissolved) | 15 | 19 | 16 | 23 | 19 | 19 | 18 | 19 |
| BET surface ($m^2/g$) | 9 | 49 | 29 | 34 | 45 | 45 | 40 | 53 |

TABLE 2

|  | Test | | | | | | | | |
| --- | --- | --- | --- | --- | --- | --- | --- | --- | --- |
|  | 1 | 2 | 3 | 4 | 5 | 6 | 7 | 8 | 9 |
| Pigment blend (in %) | A1: 100 | B1: 100 | B2: 100 | A1: 70 B2: 30 | A1: 70 B3: 30 | A1: 70 B4: 30 | A1: 70 B5: 30 | A1: 70 B6: 30 | A1: 70 B7: 30 |
| $TiO_2$ suspension used [g] | 120 | 120 | 100 | 115 | 105 | 105 | 99 | 106 | 112 |
| Pigment/pulp suspension [g] | 425 | 430 | 435 | 423 | 440 | 425 | 430 | 420 | 423 |
| Opacity (laminate) | | | | | | | | | |
| CIELAB $L^*_{black}$ | 90.0 | 91.4 | 90.8 | 90.2 | 90.4 | 90.6 | 90.5 | 90.5 | 90.9 |
| Opacity value L | 90.7 | 94.3 | 93.4 | 91.5 | 91.9 | 92.5 | 92.9 | 92 | 92.8 |
| Greying (laminate) | | | | | | | | | |
| $\Delta L^*$ | 0.9 | 4.5 | 6.9 | 2.0 | 1.5 | 1.2 | 1.3 | 1.3 | 1.3 |
| Blue wool scale [grade] | >6.0 | <6.0 | <6.0 | >6.0 | >6.0 | >6.0 | >6.0 | >6.0 | >6.0 |
| Wet maximum load [N] | 5.5 | 2.3 | 4.1 | 4.6 | 4.4 | 4.1 | 3.8 | 4.8 | 3.7 |
| Optical values (laminate) | | | | | | | | | |
| CIELAB $L^*_{white}$ | 93.4 | 93.8 | 93.3 | 93.3 | 93.4 | 93.4 | 93.3 | 93.2 | 93.7 |
| CIELAB $a^*_{white}$ | −1.4 | −1.3 | −1.4 | −1.4 | −1.3 | −1.3 | −1.4 | −1.4 | −1.3 |
| CIELAB $b^*_{white}$ | 2.2 | 2.8 | 3.2 | 2.6 | 2.5 | 2.6 | 2.8 | 2.7 | 2.6 | surface treatment. The results of Test 7 are listed in Table 2. Owing to the lower level of $SiO_2$ surface treatment of B5 compared to B4, this blend displays poorer opacity in comparison with Test 6, but comparable greying resistance.

Test 8 (A1/B6 Blend)

A pigment blend consisting of 70% by weight Pigment A1 and 30% by weight Pigment B6 is used in this test. Pigment B6 has surface treatment similar to that of Pigment B2, but with twice the quantity of $SiO_2$. The same highly stabilised base material is used as for B4. The results of Test 8 are listed in Table 2. The opacity of the laminate sample produced using this pigment blend is substantially higher than that obtained with pure A1. The wet strength is adequate and the greying resistance good.

Test 9 (A1/B7 Blend)

A pigment blend consisting of 70% by weight Pigment A1 and 30% by weight Pigment B7 is used in this test. The latter pigment has surface treatment similar to that of Pigment B6. The. results of Test 9 are listed in Table 2. Owing to a higher quantity of $SiO_2$ compared to Test 8, this pigment blend leads to a laminate with very high opacity values, substantially higher than obtained with pure Pigment A1. The greying resistance is at a good level. The wet strength of the papers containing the above pigment blend is tolerable at the upper limit.

What is claimed is:

1. A titanium dioxide pigment blend composition comprising;
    a Pigment Type A having a first titanium dioxide base material, the Pigment Type A having high greying resistance, wherein the high greying resistance is defined by a grade on the blue wool scale (ISO 4586-2) of greater than 6; and
    a Pigment Type B with an increased Si and Al content applied by precipitation of Si and Al compounds in flocculent form on to a second titanium dioxide base material, wherein the weight of the increased Si content of the Pigment Type B (calculated as $SiO_2$) is at least 3% of the weight of the titanium in the second titanium dioxide base pigment material and the total of the Si and Al weights (calculated as $SiO_2$ and $Al_2O_3$) is at least 7% of the weight of the titanium in the second titanium dioxide base pigment material.

2. The titanium dioxide pigment blend composition according to claim 1, characterized in that the second titanium base material is manufactured by the sulphate process, stabilised with up to 1% by weight aluminium (calculated as $Al_2O_3$).

3. The titanium dioxide pigment blend composition according to claim 1, characterized in that the second titanium dioxide base material is manufactured by the chloride process, stabilised with up to 3% by weight aluminium (calculated as $Al_2O_3$).

4. The titanium dioxide pigment blend composition according to claim 1, characterized in that the second titanium dioxide base material is coated immediately, initially with aluminium phosphate.

5. The titanium dioxide pigment blend composition according to claim 1, characterized in that the titanium dioxide base material is additionally coated with up to 0.2% by weight cerium (calculated as $CeO_2$) and/or up to 2.5% by weight zinc (calculated as ZnO).

6. The titanium dioxide pigment blend composition according to claim 1, characterized in that the Pigment Type B displays a nitrate content of up to 1% by weight (referred to the second titanium dioxide base material) and/or tempering at up to 500° C.

7. The titanium dioxide pigment blend composition according to claim 1, characterized in that the weight of Pigment Type B relative to the weight of the pigment blend is between 10 and 90%, preferably 30 to 50%.

8. The titanium dioxide pigment blend composition of claim 4, wherein second titanium dioxide base material is additionally coated with up to 0.2% by weight cerium (calculated as $CeO_2$) and/or up to 2.5% by weight zinc (calculated as ZnO).

9. The titanium dioxide pigment blend composition of claim 4, wherein the Pigment Type B displays a nitrate content of up to 1% of the weight of the titanium in the second titanium dioxide base pigment material and/or tempering at up to 500° C.

10. The titanium dioxide pigment blend composition of claim 4, wherein the weight of Pigment Type B relative to the pigment blend is between 10 and 90%, preferably 30 to 50%.

11. The titanium dioxide pigment blend composition of claim 5, wherein the Pigment Type B displays a nitrate content of up to 1% of the weight of the titanium in the second titanium dioxide base pigment material and/or tempering at up to 500° C.

12. The titanium dioxide pigment blend composition of claim 5, wherein the weight of Pigment Type B relative to the weight of the pigment blend is between 10 and 90%, preferably 30 to 50%.

13. The titanium dioxide pigment blend composition of claim 6, wherein the weight of Pigment Type B relative to the weight of the pigment blend is between 10 and 90%, preferably 30 to 50%.

* * * * *